United States Patent
Longman

(10) Patent No.: US 12,158,538 B2
(45) Date of Patent: Dec. 3, 2024

(54) UNSUPERVISED RADAR ANTENNA CALIBRATION

(71) Applicant: GM GLOBAL TECHNOLOGY OPERATIONS LLC, Detroit, MI (US)

(72) Inventor: Oren Longman, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 383 days.

(21) Appl. No.: 17/742,578

(22) Filed: May 12, 2022

(65) Prior Publication Data

US 2024/0310482 A1  Sep. 19, 2024

(51) Int. Cl.
*G01S 7/40* (2006.01)

(52) U.S. Cl.
CPC .......... *G01S 7/4008* (2013.01); *G01S 7/4021* (2013.01)

(58) Field of Classification Search
CPC ............................. G01S 7/4008; G01S 7/4021
See application file for complete search history.

(56) References Cited

U.S. PATENT DOCUMENTS

| | | |
|---|---|---|
| 10,921,424 B2 | 2/2021 | Longman et al. |
| 2015/0035697 A1 | 2/2015 | Cho |
| 2015/0070207 A1* | 3/2015 | Millar .................. G01S 7/4026 342/174 |
| 2015/0276923 A1 | 10/2015 | Song et al. |
| 2018/0113195 A1* | 4/2018 | Bialer .................. G01S 13/86 |
| 2018/0120414 A1 | 5/2018 | Alcalde et al. |
| 2020/0410715 A1* | 12/2020 | Cadien ................. G01S 7/497 |
| 2021/0051317 A1* | 2/2021 | Yan .......................... G06T 7/80 |
| 2021/0134079 A1* | 5/2021 | Nee ....................... G01S 7/4972 |
| 2021/0266044 A1 | 8/2021 | Jiang et al. |
| 2022/0120854 A1* | 4/2022 | Statnikov .............. G01S 7/4026 |
| 2022/0128685 A1 | 4/2022 | Longman et al. |

* cited by examiner

*Primary Examiner* — Bernarr E Gregory
(74) *Attorney, Agent, or Firm* — Quinn IP Law

(57) ABSTRACT

A system for unsupervised radar calibration of a vehicle is contemplated. The system may include a radar having a plurality of antennas configured to transmit radar signals and responsively receive reflected signals. The system may further include a calibration controller configured to determine a plurality of detections from the reflected signals corresponding with unsupervised objects in the vicinity of the vehicle, and based on the detections, to generate a calibration matrix sufficient for calibrating the radar.

18 Claims, 2 Drawing Sheets

UNSUPERVISED RADAR ANTENNA CALIBRATION

INTRODUCTION

The present disclosure relates to radar antenna calibration, such as but not necessarily limited to calibrating a vehicle radar according to radar signal reflections generated as a result of radar signals reflecting off of stationary, unsupervised objects in a vicinity of a moving vehicle.

A radar system may include a plurality of antennas configured to transmit radar signals and responsively receive reflected signals. A radar controller may be configured to process the reflected signals for purposes of identifying direction, range, or other characteristic of an object reflecting the radar signals. An ability of the radar system to operate properly and to accurately identify a location of the object may be dependent on a capability of the radar controller to account for phase and amplitude biases affecting directivity of the antennas. Fabrication inconsistencies, wear and tear, temperature variations, and other factors may cause the biasing characteristics of the antennas, even when included within the same radar system, to be disparate and variable at the time of manufacture and to continue diverting thereafter, often with the biasing varying unequally over time as the radar system is used.

A radar system may undergo a calibration process to create a calibration matrix suitable for use by the radar controller in accounting for phase and amplitude biases affecting directivity of the antennas. The calibration process generally includes transmitting radar signals and assessing characteristics of the responsively reflected signals. One type of calibration process may be referred to as a supervised calibration in that it performs the calibration based on the reflected signals reflecting off of known objects positioned within a predefined location. Such supervised calibration requires each radar system to be individually calibrated and requires continual maintenance and precise monitoring to assure the repeatable and accurate positioning of the objects. One supervised calibration process may occur within an anechoic chamber configured to enclose the radar system and the reflecting objects. Another supervised calibration process may take place in an ambient environment having particularly placed reflecting objects. Both of these supervised calibration processes may be challenging due to the precise positioning demands on the reflecting objects and due to the calibration being relatively short-term due to the initial, supervised calibration being incapable of adapting to unforeseen variations occurring while in use.

SUMMARY

Disclosed herein is a radar antenna calibration method and system capable of continuously facilitating radar calibration using unsupervised reflecting objects such that the calibration of radar antennas may be periodically updated to account for unforeseen variations without having to precisely position the reflecting objects.

One aspect of the present disclosure relates to a system for unsupervised radar calibration of a vehicle. The system may include a radar having a plurality of antennas configured to transmit radar signals and responsively receive reflected signals. The system may further include a calibration controller configured to determine a plurality of detections from the reflected signals corresponding with unsupervised objects in the vicinity of the vehicle, and based on the detections, to generate a calibration matrix sufficient for calibrating the radar.

The calibration controller may be configured to perform a detection process to determine the detections where the detection process includes a pre-processing process and a detection filtering process.

The pre-processing process may include identifying a plurality of candidates from the reflected signals where the candidates corresponding with the reflected signals having a power above a candidate threshold whereby the power is determined following the corresponding reflected signals undergoing an analog to digital conversion, a range fast Fourier transform (FFT), a Doppler FFT, and an incoherent summation.

The detection filtering process may include identifying the detections as the candidates remaining after eliminating the candidates occurring while the vehicle velocity is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

The calibration controller may be configured to perform a calibration process to generate the calibration matrix according to a calibration function, wherein the calibration function may be based on a steering vector for the detections within a boresight direction of the antennas. The calibration function may be represented as follows:

$$Cal(\theta) = SV(\theta) A_{Det_{AR}} e^{j\phi Det_{AR}} SV(-\text{Direction})$$

where $A_{Det_{AR}}$ is the amplitude of an array response for the detection and $\phi_{Det_{AR}}$ is a phase of the array response.

The calibration controller may be configured to generate the calibration matrix according to a matrix function represented as follows:

$$CalMat[i, j] = Cal(\theta_i)_j$$

$\theta_i$ are directions corresponding to index i a j indicates a vector index.

The calibration controller may be configured to perform a calibration update process to update the calibration matrix according to an update calibration process, wherein the update calibration process includes phase wrapping a normalization of the detections, generating a filter coefficient, and filtering the phase wrapped normalized detections.

One aspect of the present disclosure relates to a system for unsupervised radar calibration of a vehicle. The system may include a radar having a plurality of antennas configured to transmit radar signals and responsively receive reflected signals. The system may further include a calibration controller configured to determine a plurality of detections from the reflected signals corresponding with stationary, unsupervised objects in the vicinity of the vehicle, to normalize the detections to mitigate amplitude and phases biases of the antennas, and to adjust a current calibration matrix to an updated calibration matrix according to the normalized detections such that the updated calibration matrix provides unsupervised calibration of the antenna.

The calibration controller may be configured to perform a detection process to determine the detections where the detection process includes a pre-processing process and a detection filtering process.

The pre-processing process may include identifying a plurality of candidates from the reflected signals, the candidates corresponding with the reflected signals having a power above a candidate threshold whereby the power is determined following the corresponding reflected signals undergoing an analog to digital conversion, a range fast Fourier transform (FFT), a Doppler FFT, and an incoherent summation.

The detection filtering process may include identifying the detections as the candidates remaining after eliminating the candidates occurring while the vehicle velocity is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

The calibration controller may be configured to perform a calibration process to generate the current calibration matrix according to a calibration function where the calibration function may be based on a steering vector for the detections within a boresight direction of the antennas.

The calibration controller may be configured to perform a calibration update process to update the current calibration matrix to the updated calibration matrix where the calibration update process includes phase wrapping the normalized detections, generating a filter coefficient, and filtering the phase wrapped normalized detections.

One aspect of the present disclosure relates to a calibration controller configured to calibrate a radar of a vehicle. The controller may include a plurality of instructions stored on a non-transitory computer readable storage medium. The instructions may be executable with a processor of the controller to: determine reflected signals received at the radar in response to radar signals previously transmitted from the radar; determine a plurality of detections from the reflected signals corresponding with stationary, unsupervised objects in the vicinity of the vehicle; normalize the detections to mitigate amplitude and phases biases of the antennas; and adjust a current calibration matrix to an updated calibration matrix according to the normalized detections such that the updated calibration matrix is sufficient to calibrate the radar.

The instructions may be executable to determine the detections according to a detection process where the detection process including a pro-processing process and a detection filtering process.

The pre-processing process may include identifying a plurality of candidates from the reflected signals where the candidates correspond with the reflected signals having a power above a candidate threshold whereby the power is determined following the corresponding reflected signals undergoing an analog to digital conversion, a range fast Fourier transform (FFT), a Doppler FFT, and an incoherent summation.

The detection filtering process may include identifying the detections as the candidates remaining after eliminating the candidates occurring while the vehicle velocity is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

The instructions may be executable to perform a calibration process to generate the current calibration matrix according to a calibration function such that the calibration function is based on a steering vector for the detections within a boresight direction of the antennas.

The instructions may be executable to perform a calibration update process to update the current calibration matrix to the updated calibration matrix such that the calibration update process includes phase wrapping the normalized detections, generating a filter coefficient, and filtering the phase wrapped normalized detections.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The above features and advantages and other features and advantages of the present teachings are readily apparent from the following detailed description of the modes for carrying out the present teachings when taken in connection with the accompanying drawings. It should be understood that even though the following Figures embodiments may be separately described, single features thereof may be combined to additional embodiments.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
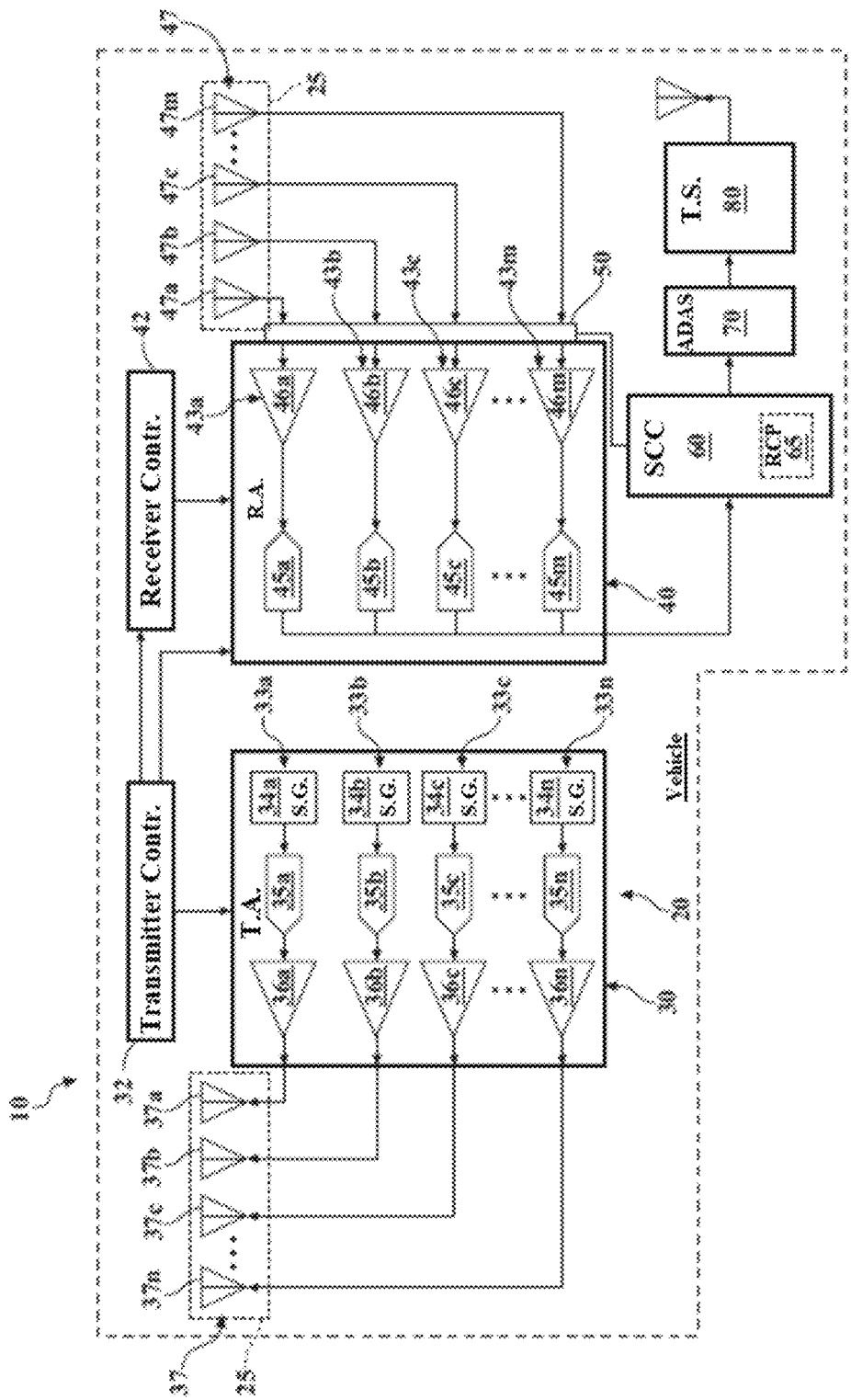
FIG. 1 schematically illustrates elements of a vehicle having a radar system in accordance with one non-limiting aspect of the present disclosure.

FIG. 1 schematically illustrates elements of a vehicle 10 having a radar system 20 in accordance with one non-limiting aspect of the present disclosure. The radar system may include a phased array antenna 25, a calibration controller 50, and a signal constructor controller 60. The vehicle 10 may be a ground vehicle in the form of a commercial vehicle, industrial vehicle, agricultural vehicle, passenger vehicle, aircraft, watercraft, train, all-terrain vehicle, personal movement apparatus, robot, automobile, or other non-vehicle type of device, such as a standalone radar installation. The vehicle 10 is predominately described for exemplary non-limiting purposes to demonstrate the capability of the present disclosure to improve the vehicle's functionality with a radar antenna calibration method and system capable of continuously facilitating radar calibration using unsupervised reflecting objects such that the calibration of radar antennas may be periodically updated to account for unforeseen variations without having to precisely position the reflecting objects.

The unsupervised radar calibration contemplated herein may be used in conjunction with various vehicle operations such as to calibrate the radar system 20 when used with an advanced driving assistance system (ADAS) 70. The ADAS 70 may be configured to provide a level of autonomous vehicle control, optionally with the assistance of a telematics system 80. The radar system 20 may be considered as an on-vehicle system that provides information related to location and trajectory of vehicles, pedestrians and other objects proximal to the vehicle 10. The ADAS 70 may make use of such radar information when informing the operator and when autonomously controlling the vehicle 10. The concepts described herein may be applied to numerous systems including vehicles and stationary devices and are not limited to on-vehicle implementations. The ADAS 70 may include an on-vehicle control system that is capable of providing a level of driving automation such that the 'operator' describes the person responsible for directing operation of the vehicle 10, whether actively involved in controlling one or more vehicle functions or directing autonomous vehicle operation. Driving automation can include various dynamic driving and vehicle operations, including some level of automatic control or intervention related to a single vehicle function, such as steering, acceleration, and/or braking, with the operator continuously having overall control of the vehicle 10.

Driving automation may include hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like. The ADAS 70 may include one or a plurality of vehicle systems and associated controllers that provide a level of driving automation. The vehicle systems, subsystems and controllers associated with the ADAS 70 may be implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The telematics system 80 may be an element of a wireless telematics communication system that is capable of extra-vehicle communication for communicating with a communication network system having wireless and wired communication capabilities. The extra-vehicle communication includes short-range vehicle-to-vehicle (V2V) communication and/or vehicle-to-everything (V2x) communication, which may include communication with an infrastructure monitor, e.g., a traffic camera, and communication to a proximal pedestrian, etc. Alternatively, or in addition, the wireless telematics communication system may be capable of short-range wireless communication to a handheld device, e.g., a cell phone, a satellite phone or another telephonic device. In one embodiment the handheld device is loaded with a software application that includes a wireless protocol to communicate with the telematics system 80, and the handheld device executes the extra-vehicle communication for communicating with an off-board controller via a communication network, which may be in the form of a satellite, a cell tower antenna, and/or another mode of communication.

The on-vehicle radar system 20 may be configured as a multiple input/multiple output (MIMO) system that includes the phased array antenna 25, a transmitter array 30, a receiver array 40, the calibration controller 50, and the signal constructor controller 60. The elements of the on-vehicle radar system 20 may be configured to operate as a frequency-modulated continuous-wave radar (FM-CW) system. The radar signals may optionally be linear-frequency-modulated continuous-wave (LFM-CW) radar signals including a chirp-start portion such that each of the receivers includes a receiving antenna that is disposed to receive reflected radar signals. The transmitters may be controllable such that the chirp-start portions of the LFM-CW radar signals that are transmitted from the second transmitters have progressively increasing time delays as compared to the chirp-start portion of the LFM-CW radar signal that is transmitted from the first transmitter.

The phased array antenna 25 may include a first antenna array 37 including a plurality of transmit antennas 37a, 37b, 37c, . . . 37n, and a second antenna array 47 including a plurality of receiving antennas 47a, 47b, 47c, . . . 47m. The plurality of transmit antennas 37a, 37b, 37c, . . . 37n of the phased array antenna 25 may be physically positioned with adjacent ones of the transmit antennas 37a, 37b, 37c, . . . 37n being separated by a predefined distance.

The transmitter array 30 of the radar system 20 may include a quantity of n transmitters 33, which are designated by numerals 33a, 33b, 33c, . . . 33n. Each of the transmitters 33a, 33b, 33c, . . . 33n includes a respective signal generator 34a, 34b, 34c, . . . 34n that is in communication with a respective digital-to-analog converter (modulator) 35a, 35b, 35c, . . . 35n that is in communication with a respective power amplifier 36a, 36b, 36c, . . . 36n, which supplies a power signal to a respective one of the transmit antennas 37a, 37b, 37c, . . . 37n. The operation of the transmitters 33a, 33b, 33c, . . . 33n may be controlled by a transmitter controller 32. In one embodiment, the signal generators 34a, 34b, 34c, . . . 34n are chirp digital direct synthesizer devices. The n transmitters 33 may be disposed in a common location on the vehicle 10 in one embodiment.

The receiver array 40 may include a quantity of m receivers 43, which are designated by numerals 43a, 43b, 43c, . . . 43m. Each of the receivers 43a, 43b, 43c, . . . 43m includes a respective one of the receiving antennas 47a, 47b, 47c, . . . 47m that is in communication with a respective power amplifier 46a, 46b, 46c, . . . 46m that is in communication with a respective analog-to-digital converter 45a, 45b, 45c, . . . 45m. The operation of the receivers 43a, 43b, 43c, . . . 43m is controlled by a receiver controller 42. The m receivers 43 are disposed in a common location on the vehicle 10 in one embodiment. The m receivers 43 and the n transmitters 33 are disposed in a common location on the vehicle 10 in one embodiment.

The transmitter controller 32 may communicate with each of the transmitters 33a, 33b, 33c, . . . 33n, the receiver controller 42, and in one embodiment, the receivers 43a, 43b, 43c, . . . 43m. The receiver controller 42 communicates with the receivers 43a, 43b, 43c, . . . 43m. The receivers 43a, 43b, 43c, . . . 43m communicate with the signal constructor controller 60. The transmitter controller 32 may command timing and control of the transmitters 33a, 33b, 33c, . . . 33n to generate and transmit radar signals. The receiver controller 42 interacts with the receivers 43a, 43b, 43c, . . . 43m to receive and record a reflected radar signal, i.e., an echo signal. The signal constructor controller 60 effects image formation and analysis based upon the radar signal reception and recorded data. It also employs a matched filter to permit the received signals to be individually discernible over the series of the LFM radar signals.

Figure 2:
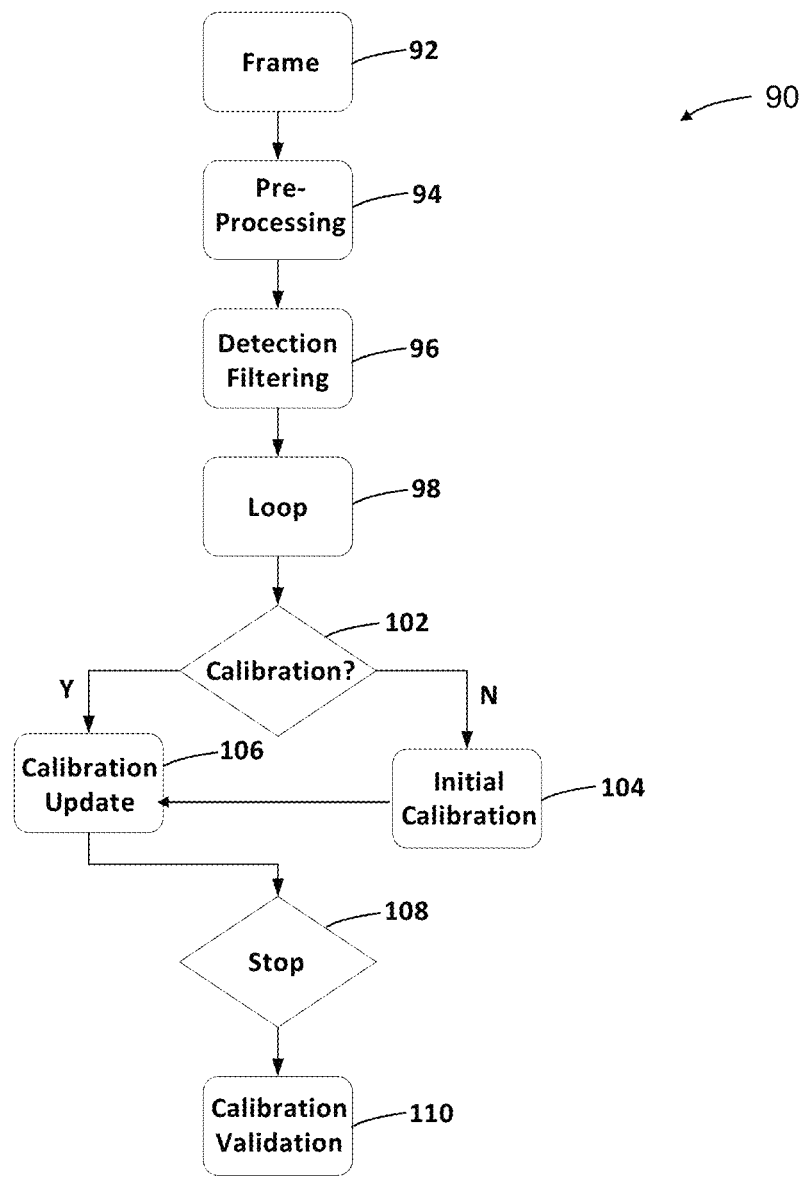
FIG. 2 illustrates a flowchart of a method for unsupervised radar calibration in accordance with one non-limiting aspect of the present disclosure.

The calibration controller 50, which may include corresponding circuitry, may be interposed between the phased array antenna 25, the transmitter array 30, and the receiver array 40. Operation of the calibration controller 50 to dynamically calibrate the radar system 20 may be coordinated with the signal constructor controller 60 via a radar calibration process 65. The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. FIG. 2 illustrates a flowchart 90 of a method for unsupervised radar calibration in accordance with one non-limiting aspect of the present disclosure. The method may be embodied as a plurality of instructions stared on a non-transitory computer readable storage medium of the radar system 20, which when executed with a processor, are sufficient to facilitate the operations and processes described herein as part of the radar calibration process 65. The method may be capable of continuously facilitating radar calibration using unsupervised reflecting objects such that the calibration may be periodically updated to account for unforeseen variations without having to precisely position the reflecting objects. One aspect of the present disclosure contemplates eliminating a need for anechoic chamber calibration and to instead provide radar calibration within an ambient or natural environment of the vehicle, optionally to prevent calibration degradation. The method may utilize unsupervised, static objects to casually generate reflected radar signal and based thereon estimate a direction for the objects from an associated Doppler reading induced by the vehicle movement such that expected antenna phases and amplitudes may be compared with received values to estimate biases and a suitable calibration matrix.

Block 92 relates to a transmission process for controlling the radar system 20 to transmit radar signals and responsively receive reflected signals, i.e., the calibration controller 50 may correspondingly control the transmit and receive phased array antennas 25, 47. The transmission process may operate over multiple frames to gather a substantial quantity of data that may then be used to achieve high accuracy calibration information. The frames may correspond with radar pulses periodically transmitted over a unit of time. The radar antenna may be rotated to correspondingly collect reflected signals over a set of angles associated with an operating field-of-view. A response in the form of voltages may be collected for each element of the antennas such that these responses may be characterized as an array response. The array responses may be determined for each of the angles tested. The calibration controller 50 may be configured to determine a plurality of detections from the reflected signals whereby the corresponding information may be used to generate an initial or existing calibration matrix, if needed, and/or to update that calibration matrix to an updated calibration matrix according to the detections. The detections may correspond with the reflected signals identified to correspond with objects suitable for calibrating the radar system 20. Because the calibration is contemplated to occur in the natural environment, some of the reflected signals may be unusable or undesirable for calibration and correspondingly discarded.

Block 94 relates to a pre-processing process where the calibration controller 50 begins analyzing the reflected signals to identify those that may be suitable as detections, i.e., to initially separate the usable signals from the unusable signals. The calibration controller 50 may provisionally identify portions of the reflected signals passing the process described herein as candidates and thereafter perform further processing on the candidates to determine the detections to be used for calibration. The differentiation between candidates and detections may be beneficial in providing a multi-stage process for analyzing the reflected signals such that, in order to be considered as a detection, the corresponding signals may first be identified as a candidate and thereafter pass additional processing before being identified as a detection suitable for calibration. The candidates may correspond with the array responses of the reflected signals having a power above a candidate threshold whereby the power is determined following the corresponding reflected signals undergoing an analog to digital conversion, a range fast Fourier transform (FFT), a Doppler FFT, and an incoherent summation.

The incoherent summation of the array responses may be compared to the candidate threshold to determine whether the corresponding reflected signals should be discarded or further analyzed. The incoherent summary may be used to generate absolute values useful in comparison to the candidate threshold, i.e., to identify whether the corresponding reflected signals should be discarded or identified as a candidate for further processing. The incoherent summation may be used instead of digital beam forming to generate a calibration invariant. The incoherent summation may be performed according to equation 1:

$$X[k, l] = \sum_c |x[k, l, c]| \qquad \text{[equation 1]}$$

where x is the signal after Doppler FFT, k is the range index, l is the Doppler index and c is the channel index.

Block 96 relates to a detection filtering process whereby the candidates identified in Block 94 are further processed to determine any of the candidates to be considered as detections. The detections, i.e., the array response desired for calibration, may be determined at the conclusion of the detection filtering process as the candidates remaining after eliminating the candidates occurring while the vehicle velocity is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

The candidates may be compared to a vehicle threshold to assure a sufficient amount of Doppler-based directionality, i.e., accuracy may be maximized when the vehicle is traveling above the vehicle threshold due to reflected signals having more spatial diversity. The reflected signals may be analyzed for minimum velocity according to equation 2:

$$Vel_{host} > Threshold_{Vel} \quad \text{[equation 2]}$$

where $Vel_{host}$ is vehicle velocity at the time of receiving the reflected signals and $Threshold_{vel}$ is the vehicle threshold.

The candidates passing the minimum velocity may then be analyzed relative to another power threshold, which for exemplary purposes is noted as being a filter threshold. The filter threshold may be the same or deviate from the power threshold used in Block 94 in order to provide different circumstances for analysis. The filter threshold may be used to limit the detections to those having power levels sufficient for accurate calibration. The reflected signals may be analyzed for power according to equation 3:

$$Det_{Power} > Threshold_{power} \quad \text{[equation 3]}$$

where $Det_{Power}$ is the power of the reflected signals and $Threshold_{power}$ is the filter threshold.

The candidates passing the power threshold may then be analyzed relative to a peak detection whereby the candidates within a group, i.e., the reflected signals associated with the same object, may be reduced by eliminating the reflected signals from further processing except for the reflected signals associated with a peak power. This may be useful in minimizing the number of detections by using a single peak detection for the object instead of multiple detections for the same object. An object may be expressed with multiple detections such that a peak detector may be used to select the highest power detection of each target. This may be performed by creating a black and white image with range and Doppler grids such that range-Doppler cells with detections are colored black with the remaining being colored white. A connected components algorithm can be used to find detection groups such that, for each detection group, the highest power detection is selected, and the rest of the detections are filtered out.

The candidates passing the peak detection may be finally filtered, i.e., determined to be a detection or not a detection, as a function of a dynamic target filtering. The dynamic target filtering may be used to eliminate candidates associated with moving objects. The dynamic target filtering may include eliminating the candidates having a difference between direction based on beamforming and direction based on Doppler in excess of a directional threshold. The latest calibration may be used in digital beamforming to estimate the detection direction, if no calibration exists, a digital FFT may be used with the result being stored as $Det_{\theta_s}$. The direction may be estimated under the assumption that the target is static, and using the host vehicle ego velocity and radar alignment Yaw, the resulting direction is either positive or negative according to equation 4:

$$Det_{\pm\theta_d} = \pm\cos^{-1}\frac{Det_{Doppler}}{Vel_{host}} - Yaw \quad \text{[equation 4]}$$

If the difference between the estimated directions is greater than a threshold, then the target is considered to be dynamic and the detection is removed according to equation 5:

$$|Det_{\theta_s} - Det_{\theta_d}| < Threshold_{DOA} \quad \text{[equation 5]}$$

where $Det_{\theta_s}$ is the beamforming direction, $Det_{\theta_d}$ is the Doppler direction, and $Threshold_{DOA}$ is the directional threshold.

Block 98 relates to a detection loop process whereby the detections which passed the filtering stage at block 96 are processed one by one.

Block 102 relates to determining whether the radar system 20 has an existing calibration, i.e., whether the radar system 20 already has a current calibration matrix. The calibration matrix may be set at the time of manufacture as an identity matrix, a matrix generated during a previous calibration, or a default. In the event the radar system 20 fails to include an existing calibration matrix or some other placeholder, Block 104 relates to generating a calibration matrix based on the detections resulting from Block 98.

Block 104 relates to performing a calibration process to generate the calibration matrix according to a calibration function. The calibration function may be based on a steering vector determined for the direction of the detection if the detection direction, e.g., estimated using the detection Doppler as an approximate to the boresight, is below a boresight threshold, i.e., to use a detection with Doppler-based direction corresponding to the antenna's boresight in order to mitigate direction ambiguity in non-boresight directions. The detections may be correspondingly eliminated according to equation 6:

$$Det_{+\theta_d} < Threshold_{boresight} \quad \text{[equation 6]}$$

where $Det_{+\theta_d}$ is determined according to equation 4 and $Threshold_{boresight}$ is the boresight threshold.

The positive or negative direction may be selected using spatial information as defined according to equation 7:

$$\text{Direction} = \underset{Det_{\pm\theta_d}}{\operatorname{argmax}} |SV(Det_{\pm\theta_d})Det_{ArrayResponse}| \quad \text{[equation 7]}$$

Where $SV(\theta)$ is the steering vector with direction $\theta$ defined by equation 8:

$$SV(x) = e^{-j2\pi\frac{d}{\lambda}\sin(\theta)} \quad \text{[equation 8]}$$

Based on the detection measurement a calibration function is generated according to equation 9:

$$Cal(\theta) = SV(\theta)A_{Det_{AR}}e^{j\phi Det_{AR}}SV(-\text{Direction}) \quad \text{[equation 9]}$$

where $A_{Det_{AR}}$ is the amplitude of the detection's array response and $\phi_{Det_{AR}}$ is the phase of the detection's array response.

A matrix function may be used to create the calibration matrix according to equation 10:

$$CalMat[i, j] = Cal(\theta_i)_j \quad \text{[equation 10]}$$

$\theta_i$ are directions corresponding to index i and j indicates the vector index.

Block 106 relates to performing a calibration update process to update the current calibration matrix, i.e., the initial calibration matrix or other previously stored/relied upon calibration matrix according to an update calibration process. The calibration update process may include phase wrapping a normalization of the detections, generating a filter coefficient, and filtering the phase wrapped normalized detections.

To mitigate phase and amplitude biases, the detections may be normalized according to equations 11 and 12:

$$phase_{new_{ij}} = \phi_{Det}2\pi\frac{d}{\lambda}\sin(-\text{Direction}) - \phi_{Det_1} \quad \text{[equation 11]}$$

where $\phi_{Det}$ is the phase of the detection's array response, d is the distance between the antenna elements, $\lambda$ is the signal wavelength; and $$amp_{new_{ij}} = \frac{A_{Det_{AR}}}{A_{Det_{AR_1}}} \quad \text{[equation 12]}$$

where $A_{Det_{AR}}$ is the detection's array response amplitude.

To account for a normalization inducing phase wrapped, a wrapping process may include wrapping the phase to $[0,2\pi]$ boundary according to equation 13:

$$\text{If } phase_{new_{ij}} > 2\pi \quad \text{[equation 13]}$$
$$phase_{new_{ij}} = phase_{new_{ij}} - 2\pi$$
$$\text{If } phase_{new_{ij}} < 0$$
$$phase_{new_{ij}} = phase_{new_{ij}} + 2\pi$$

A coefficient calculation process may include calculating a filter coefficient for the update according to equation 14:

$$\alpha_i = \frac{\alpha_{base}}{e^{\frac{d}{s}}} \quad \text{[equation 14]}$$

where $d=|i-I|$, I is the index corresponding to the detection direction and s and $\alpha_{base}$ are design or preselected parameters.

A filtering process may be used to update the calibration matrix to the updated calibration matrix using the amplitude and phase of the calibration matrix with a filter of equation 15:

$$phase_{update_{ij}} = (1 - \alpha_i)phase_{cur_{ij}} + \alpha_i phase_{new_{ij}} \quad \text{[equation 15]}$$
$$amp_{update_{ij}} = (1 - \alpha_i)amp_{cur_{ij}} + \alpha_i amp_{new_{ij}}$$

where $$phase_{cur_{ij}} = \tan^{-1}\frac{Im(CalMat[i, j])}{Re(CalMat[i, j])}$$
$$amp_{cur_{ij}} = |CalMat[i, j]|$$

where CalMat is the current calibration matrix

The updated calibration matrix may then be determined according to equation 16:

$$CalMat[i, j] = amp_{update_{ij}}e^{jphase_{update_{ij}}} \quad \text{[equation 16]}$$

Block 108 relates to a collection stop whereby a calibration data collection and update stops after reaching a directional counter criteria, which may correspond with a direction span (e.g., −45°,45° being divided into B buckets such that each bucket is required to have a minimal number of N valid detections before updating the calibration matrix.

Block 110 relates to a calibration verification process where the resulting calibration matrix may be validated by testing a corresponding confusion matrix according to equation 17:

$$ConMat = CalMat \cdot CalMat^H \quad \text{[equation 17]}$$

Accuracy Criteria:

$$\sqrt{\frac{1}{I}\sum_i \left(\underset{j}{argmax}|ConMat_{ij}| - i\right)^2} < ACC$$

Sidelobe Level Criteria:

$$\frac{1}{H}\sum_{\substack{i<j-BW \\ i>j+BW}}|ConMat_{ij}|^2 < SLL$$

Where I is the number of i indexes and H is the summation length, ACC and SLL are parameters and BW is the beamwidth.

As described herein, the contemplated calibration may include processing detects targets and estimating the target azimuth using measured Doppler on static objects with known ego velocity and known radar alignment such that the calibration may be derived from the difference between the expected steering vector and measured.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for unsupervised radar calibration on a vehicle, the system comprising:
a radar located on the vehicle and having a plurality of antennas, wherein the plurality of antennas are configured to transmit radar signals and responsively receive reflected signals; and
a calibration controller for performing the unsupervised radar calibration, wherein the calibration controller is configured to determine a plurality of detections from the reflected signals corresponding with unsupervised objects in a vicinity of the vehicle, and based on the detections, to generate a calibration matrix utilized for calibrating the radar and the calibration controller is configured to perform a detection process to determine the detections, the detection process including a pre-processing process and a detection filtering process, the pre-processing process includes identifying a plurality of candidates from the reflected signals, the candidates corresponding with the reflected signals having a power above a candidate threshold whereby the power is determined following the corresponding reflected signals undergoing an analog to digital conversion, a range fast Fourier transform (FFT), a Doppler FFT, and an incoherent summation.

2. The system of claim 1 wherein the detection filtering process includes identifying the detections as the candidates remaining after eliminating the candidates occurring while a velocity of the vehicle is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

3. The system according to claim 2 wherein the calibration controller is configured to perform a calibration process to generate the calibration matrix according to a calibration function, wherein the calibration function is based on a steering vector for the detections within a boresight direction of the antennas.

4. The system according to claim 3 wherein the calibration function is represented as follows:

$$Cal(\theta) = SV(\theta) A_{Det_{AR}} e^{j\phi_{Det_{AR}}} SV(-\text{Direction})$$

where $A_{Det_{AR}}$ is an amplitude of an array response for the detection and $\phi_{Det_{AR}}$ is a phase of the array response.

5. The system according to claim 4 wherein the calibration matrix is generated according to a matrix function, the matrix function being represented as follows:

$$CalMat[i, j] = Cal(\theta_i)_j$$

$\theta_i$ are directions corresponding to index i and j indicates a vector index.

6. The system according to claim 5 wherein the calibration controller is configured to perform a calibration update process to update the calibration matrix according to an update calibration process, wherein the update calibration process includes phase wrapping a normalization of the detections, generating a filter coefficient, and filtering the phase wrapped normalized detections.

7. A system for unsupervised radar calibration on a vehicle, the system comprising:
a radar having a plurality of antennas, wherein the plurality of antennas are configured to transmit radar signals and responsively receive reflected signals; and
a calibration controller configured to perform the unsupervised radar calibration by determining a plurality of detections from the reflected signals corresponding with stationary, unsupervised objects in a vicinity of the vehicle, to normalize the detections to mitigate amplitude and phases biases of the antennas, and to adjust a current calibration matrix to an updated calibration matrix according to the normalized detections, the updated calibration matrix utilize for unsupervised calibration of the antennas.

8. The system according to claim 7 wherein the calibration controller is configured to perform a detection process to determine the detections, the detection process including a pro-processing process and a detection filtering process.

9. The system according to claim 8 wherein the pre-processing process includes identifying a plurality of candidates from the reflected signals, the candidates corresponding with the reflected signals having a power above a candidate threshold whereby the power is determined following the corresponding reflected signals undergoing an analog to digital conversion, a range fast Fourier transform (FFT), a Doppler FFT, and an incoherent summation.

10. The system of claim 9 wherein the detection filtering process includes identifying the detections as the candidates remaining after eliminating the candidates occurring while a velocity of the is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

11. The system according to claim 10 wherein the calibration controller is configured to perform a calibration process to generate the current calibration matrix according to a calibration function, wherein the calibration function is based on a steering vector for the detections within a boresight direction of the antennas.

12. The system according to claim 11 wherein the calibration controller is configured to perform a calibration update process to update the current calibration matrix to the updated calibration matrix, wherein the calibration update process includes phase wrapping the normalized detections, generating a filter coefficient, and filtering the phase wrapped normalized detections.

13. A calibration controller configured to calibrate a radar on a vehicle, the calibration controller comprising:
a plurality of instructions stored on a non-transitory computer readable storage medium, the instructions being executable with a processor on the calibration controller to:
determine reflected signals received at the radar in response to radar signals previously transmitted from the radar;
determine a plurality of detections from the reflected signals corresponding with stationary, unsupervised objects in a vicinity of the vehicle;
normalize the detections to mitigate amplitude and phases biases of the radar; and
adjust a current calibration matrix to an updated calibration matrix according to the normalized detections, the updated calibration matrix utilized for calibrating the radar.

14. The controller according to claim 13 wherein the instructions are executable to determine the detections according to a detection process, the detection process including a pre-processing process and a detection filtering process.

15. The controller according to claim 14 wherein the pre-processing process includes identifying a plurality of candidates from the reflected signals, the candidates corresponding with the reflected signals having a power above a candidate threshold whereby the power is determined following the corresponding reflected signals undergoing an analog to digital conversion, a range fast Fourier transform (FFT), a Doppler FFT, and an incoherent summation.

16. The controller according to claim 15 wherein the detection filtering process includes identifying the detections as the candidates remaining after eliminating the candidates occurring while a velocity of the vehicle is below a vehicle threshold, eliminating the candidates having a power below a filter threshold, eliminating the candidates within a group having less than a peak power, and eliminating the candidates with an array response having a difference between beamforming FFT and Doppler FFT in excess of a directional threshold.

17. The controller according to claim 16 wherein the instructions are executable to perform a calibration process to generate the current calibration matrix according to a calibration function, wherein the calibration function is based on a steering vector for the detections within a boresight direction of the radar.

18. The controller according to claim 13 wherein the instructions are executable to perform a calibration update process to update the current calibration matrix to the updated calibration matrix, wherein the calibration update process includes phase wrapping the normalized detections, generating a filter coefficient, and filtering the phase wrapped normalized detections.

* * * * *